United States Patent
Bernet

[11] Patent Number: 5,889,667
[45] Date of Patent: Mar. 30, 1999

[54] QUASI-RESONANT BUCK CONVERTER WITH SOFT SWITCHING

[75] Inventor: Steffen Bernet, Bammental, Germany

[73] Assignee: ABB Patent GmbH, Mannheim, Germany

[21] Appl. No.: 920,471

[22] Filed: Aug. 29, 1997

[30] Foreign Application Priority Data

Aug. 29, 1996 [DE] Germany .................. 196 34 905.2

[51] Int. Cl.$^6$ ............................................. H02M 7/5387
[52] U.S. Cl. ............................ 363/127; 323/239; 363/44
[58] Field of Search ............................... 363/44, 84, 125, 363/126, 127, 128; 323/239, 324

[56] References Cited

U.S. PATENT DOCUMENTS 5,216,352  6/1993  Studtmann et al. ............... 323/241
5,633,793  5/1997  Lee et al. ............................ 363/127

*Primary Examiner*—Adolf Berhane
*Attorney, Agent, or Firm*—Herbert L. Lerner; Laurence A. Greenberg

[57] ABSTRACT

A rectifier circuit in a three-phase bridge connection includes four-segment main switches. Resonance capacitors are each connected in parallel with a respective one of the main switches. An auxiliary commutation device is connected between two DC terminals. The auxiliary commutation device has an auxiliary four-segment switch and a resonance inductor connected in series therewith.

11 Claims, 3 Drawing Sheets

Fig.3

TABLE
PULSE PATTERN OF THE QUASI-RESONANT RECTIFIER

| $U_i$ INTERVAL | DIRECTION OF $I_{ox}$ (x=1,3) | PULSE PATTERN AND SWITCHING SEQUENCE (F:FORWARD; B:BACKWARD; x=(1,3); a:ARCP-COMMUTATION; c:CAPACITIVE (ZVS) COMMUTATION) | |
|---|---|---|---|
| 1 | $i_{ox}>0$ | $S_{x3} \xrightarrow{a} S_{x1} \xrightarrow{c} S_{x2} \xrightarrow{c} S_{x3}$ | F |
|   | $i_{ox}<0$ | $S_{x1} \xrightarrow{a} S_{x3} \xrightarrow{c} S_{x2} \xrightarrow{c} S_{x1}$ | B |
| 2 | $i_{ox}>0$ | $S_{x3} \xrightarrow{a} S_{x2} \xrightarrow{c} S_{x1} \xrightarrow{c} S_{x3}$ | B |
|   | $i_{ox}<0$ | $S_{x2} \xrightarrow{a} S_{x3} \xrightarrow{c} S_{x1} \xrightarrow{c} S_{x2}$ | F |
| 3 | $i_{ox}>0$ | $S_{x1} \xrightarrow{a} S_{x2} \xrightarrow{c} S_{x3} \xrightarrow{c} S_{x1}$ | F |
|   | $i_{ox}<0$ | $S_{x2} \xrightarrow{a} S_{x1} \xrightarrow{c} S_{x3} \xrightarrow{c} S_{x2}$ | B |
| 4 | $i_{ox}>0$ | $S_{x1} \xrightarrow{a} S_{x3} \xrightarrow{c} S_{x2} \xrightarrow{c} S_{x1}$ | B |
|   | $i_{ox}<0$ | $S_{x3} \xrightarrow{a} S_{x1} \xrightarrow{c} S_{x2} \xrightarrow{c} S_{x3}$ | F |
| 5 | $i_{ox}>0$ | $S_{x2} \xrightarrow{a} S_{x3} \xrightarrow{c} S_{x1} \xrightarrow{c} S_{x2}$ | F |
|   | $i_{ox}<0$ | $S_{x3} \xrightarrow{a} S_{x2} \xrightarrow{c} S_{x1} \xrightarrow{c} S_{x3}$ | B |
| 6 | $i_{ox}>0$ | $S_{x2} \xrightarrow{a} S_{x1} \xrightarrow{c} S_{x3} \xrightarrow{c} S_{x2}$ | B |
|   | $i_{ox}<0$ | $S_{x1} \xrightarrow{a} S_{x2} \xrightarrow{c} S_{x3} \xrightarrow{c} S_{x1}$ | F |

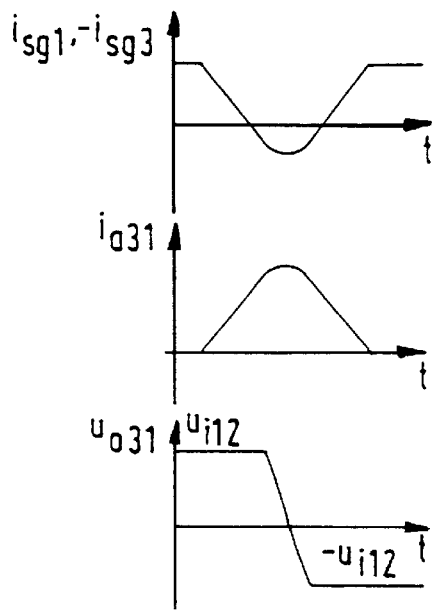

QUASI-RESONANT BUCK CONVERTER WITH SOFT SWITCHING

BACKGROUND OF THE INVENTION

Field of the Invention

The invention relates to a rectifier circuit in a three-phase bridge connection with four-segment switches as main switches.

The proposed rectifier circuit can be used, for example, in electric drive engineering (DC drives), in battery chargers and in uninterruptable power supply systems.

Since DC drives can be operated in four quadrants (DC voltage greater than, equal to or less than zero, direct current greater than, equal to or less than zero) reversible converters, i.e. two antiparallel six-pulse groups (rectifiers, power converters) with a total of twelve thyristors are generally used for feeding them when conventional technology is used. In that case, at the change-over from the motive mode to the generating mode, and conversely from the generating mode into the motive mode, either disadvantageous dead times have to be accepted or additional circuit current inductors for the circuit currents which flow have to be installed and special driving methods have to be implemented. The functional principle of such converters requires that reversible converters draw non-sinusoidal currents from the three-phase network and that they cause considerable harmonics, reactive power and network reactions, so that there is the disadvantageous need to provide costly filters in the three-phase network.

If a sinusoidal, three-phase current flow is required in the medium power range, an IGBT converter, including a network-side PWM rectifier (pulse-width-modulated rectifier) and a four-quadrant converter, can be used. The PWM modulation method enables sinusoidal network currents with an adjustable power factor to be implemented. Ten IGBTs with ten inverse diodes are required, together with expensive and comparatively unreliable electrolyte capacitors in the intermediate circuit. The considerable switching losses due to the hard switching processes limit the maximum switching frequency of such converters in the medium power range to 10 to 20 kHz with an efficiency rate of approximately 90%.

SUMMARY OF THE INVENTION

It is accordingly an object of the invention to provide a rectifier circuit, which overcomes the hereinafore-mentioned disadvantages of the heretofore-known devices of this general type, which has a relatively high power density and a higher efficiency rate and which permits higher switching frequencies.

With the foregoing and other objects in view there is provided, in accordance with the invention, a rectifier circuit in a three-phase bridge connection, comprising two DC terminals; four-segment main switches; resonance capacitors each connected in parallel with a respective one of the main switches; and an auxiliary commutation device connected between the two DC terminals and having an auxiliary four-segment switch and a resonance inductor connected in series with the auxiliary four-segment switch.

In accordance with another feature of the invention, at least one of the four-segment switches includes two parallel circuits connected in series with each other, each of the parallel circuits having an IGBT semiconductor and an inverse diode.

In accordance with a concomitant feature of the invention, the main switches each have two symmetrically blockable GTO thyristors connected in parallel, and the auxiliary switch has two parallel, symmetrically blockable GTO thyristors or symmetrically blocking high-speed thyristors.

The advantages which can be achieved with the invention are in particular the fact that the proposed novel rectifier permits PWM modulation methods with very low switching losses. The rectifier can draw sinusoidal currents from the three-phase network with a power factor of cos φ=1 and feed into the network sinusoidal currents with a power factor of cos φ=−1. The high possible switching frequency in comparison with conventional rectifiers also permits a substantial reduction in the filter complexity in the three-phase network. The proposed circuit can thus be advantageously used in all rectifier applications in which electrical isolation is not necessary between the three-phase network and the DC side.

It is advantageous that, during the changeover from the motive mode into the generating mode, and from the generating mode into the motive mode, it is necessary neither to observe dead times nor to have special drive methods or additional circuit current inductors.

In comparison with the PWM rectifier four-quadrant converter structure, the power semiconductor complexity with twelve IGBTs and twelve diodes (or twelve GTOs) with 33% reduced rated currents and two IGBTs and two diodes (or two GTO thyristors or high-speed thyristors) with very small rated current, is of approximately identical size. The 33% reduction in the rated currents is the consequence of the effective parallel switching of the main switches of a switch group. However, the proposed rectifier requires substantially fewer passive components, for example no capacitors on the DC side due to the single-stage power conversion. Due to the higher switching frequency, the filter complexity is also reduced.

The switching losses, which are low due to the principle, also advantageously result in a reduction in the cooling expenditure and an increase in the efficiency rate.

Other features which are considered as characteristic for the invention are set forth in the appended claims.

Although the invention is illustrated and described herein embodied in a rectifier circuit, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 3 is a table showing the pulse pattern of the quasi-resonant rectifier;

FIG. 4 is a graph showing current and voltage profiles of an ARCP commutation in a voltage interval (voltage interval 6)

DESCRIPTION OF THE PREFERRED EMBODIMENTS

Figure 1:
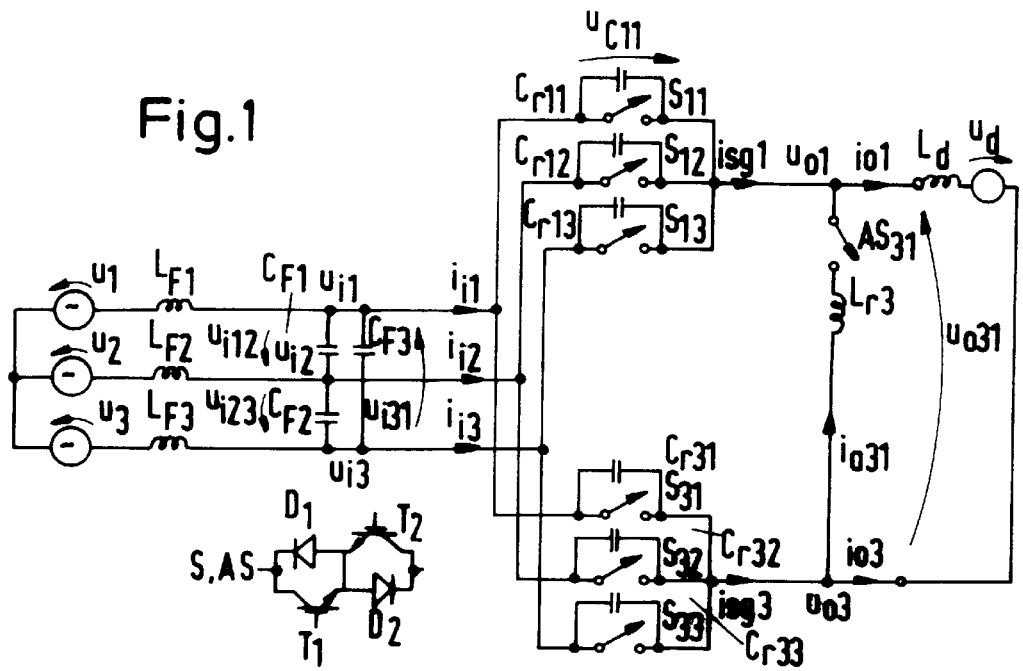
FIG. 1 is a schematic circuit diagram of a quasi-resonant rectifier (modified matrix converter)

Referring now to the figures of the drawings in detail and first, particularly, to FIG. 1 thereof, there is seen a circuit of a quasi-resonant rectifier (modified matrix converter). With regard to a matrix converter see, for example, a paper by B. S. Bernet, T. Matsuo and T. A. Lipo, entitled A Matrix Converter Using Reverse Blocking NPT-IGBTs and Optimized Pulse Patterns, in Conf. Rec. IEEE-PESC, Baveno, June 1996, pp. 107 to 113). A three-phase filter with filter inductors $L_{F1}$ and $L_{F2}$ and $L_{F3}$ in the phases and filter capacitors $C_{F1}$ and $C_{F2}$ and $C_{F3}$ between the phases is also connected, on one hand, to a three-phase network with network voltages $u_1$, $u_2$, $u_3$ and, on the other hand, to two three-phase switch groups of the rectifier in each case. Input voltages of the rectifier or of the two switch groups, which voltages are referred to a star point of the network, are designated by reference symbols $u_{i1}$, $u_{i2}$, $u_{i3}$ (and are generally designated as $u_i$) and phase-to-phase voltages are designated by reference symbols $u_{i12}$, $u_{i23}$, $u_{i31}$. Input currents of the rectifier and of the switch groups are designated by reference symbols $i_{i1}$, $i_{i2}$, $i_{i3}$.

A first switch group has three main switches $S_{11}$, $S_{12}$, $S_{13}$ which are each connected to one respective phase. Resonance capacitors $C_{r11}$, $C_{r12}$, $C_{r13}$ are connected in parallel with the main switches. Switch voltages (which are equal to the voltages at the resonance capacitors) are designated by reference symbols $u_{c11}$, $u_{c12}$, $u_{c13}$. Outputs of the main switches $S_{11}$, $S_{12}$, $S_{13}$ are connected to one another. A switch group current flowing across the common output is designated by reference symbol $i_{Sg1}$ and an output voltage of this first switch group is designated by reference symbol $u_{o1}$.

A second switch group also has three main switches $S_{31}$, $S_{32}$, $S_{33}$ which are each connected to one respective phase. Resonance capacitors $C_{r31}$, $C_{r32}$, $C_{r33}$ are connected in parallel with the main switches. Outputs of the main switches $S_{31}$, $S_{32}$, $S_{33}$ are connected to one another. A switch group current flowing across the common output is designated by reference symbol $i_{Sg3}$ and an output voltage of this second switch group is designated by reference symbol $u_{o3}$.

The outputs of the two switch groups can be connected to one another through an auxiliary switch $AS_{31}$ of an auxiliary commutation device with a series-connected resonance inductor $L_{r3}$. The current through the auxiliary commutation device is designated by reference symbol $i_{a3l}$.

Connection points of the auxiliary commutation device to the outputs of the two switch groups form load terminals of the rectifier, between which a voltage $u_{o31}$ is present and across which output currents $i_{o1}$ and $i_{o3}$ flow. A load inductance is designated by reference symbol $L_d$ and a load voltage (which is a dc voltage or ac voltage) is designated by reference symbol $u_d$.

A left-hand section of FIG. 1 illustrates an example of a layout of the main switch (four-segment switch) $S_{11}$, $S_{12}$, $S_{13}$, $S_{31}$, $S_{32}$, $S_{33}$ (generally referred to as S) and of the auxiliary switch (four-segment switch) $AS_{31}$ (generally referred to as AS). As can be seen, the four-segment switch includes two IGBT semiconductors $T_1$, $T_2$ and two inverse diodes $D_1$, $D_2$. The diode $D_1$ and the transistor $T_1$, on one hand, and the diode $D_2$ and the transistor $T_2$, on the other, are connected in parallel and both parallel circuits are in series. The two IGBT semiconductors and inverse diodes for forming the auxiliary switch $AS_{31}$, are to be dimensioned for substantially lower rated currents than the components for implementing the main switches $S_{11}$ ... $S_{33}$.

Alternatively, the four-segment main switches S can also be implemented on the basis of other power semiconductor components which can be actively switched off (for example GTOs, MOSFETs, bipolar transistors or MCTs) as well as diodes which may be necessary. In contrast thereto, the four-segment auxiliary switch AS can alternatively be implemented by using power semiconductor components which can be actively switched on (for example thyristors, GTOs, MCTs, MOSFETs or bipolar transistors) as well as diodes which may be necessary. In the upper power range it is, in particular, possible to use twelve symmetrically blockable GTOs in the main switches as well as two symmetrically blockable GTOs or two symmetrically blockable high-speed thyristors with reduced rated currents in the auxiliary switch, with two GTO thyristors and two high-speed thyristors being connected in parallel in each case.

In a conventional, hard-switching matrix converter, generally half the commutations taking place are inductive and half capacitive. An inductive commutation (positive power gradient) is initiated in this case by an active switching-on process of a four-segment switch and terminated by a passive switching-off process of the switching-off four-segment switch during the interruption of the reverse current. In contrast thereto, a capacitive commutation (negative power gradient) is triggered by an active switching-off process of a four-segment switch and is concluded, at a switch voltage of approximately zero, by a passive switching-on process of the four-segment switch involved in the commutation. If a drive method derived in a paper by M. G. B. Venturini and A. Alesina, entitled "Intrinsic Amplitude Limits and Optimum Design of 9-Switch Direct PWM-ac-ac Converters", in Conf. Rec. IEEE-PESC, 1988, pages 1284 to 1291, is used to drive the matrix converter, sinusoidal currents with an adjustable power factor and the maximum possible voltage transmission ratio can be generated on the input side. However, since that algorithm determines only the pulse duty factors, given a conventional hard-switching matrix converter it is also necessary to optimize the degree of freedom, the pulse patterns.

In the proposed quasi-resonant matrix converter used as a rectifier according to FIG. 1, the function of the commutation device determines both the switching sequence and the pulse patterns.

Figure 2:
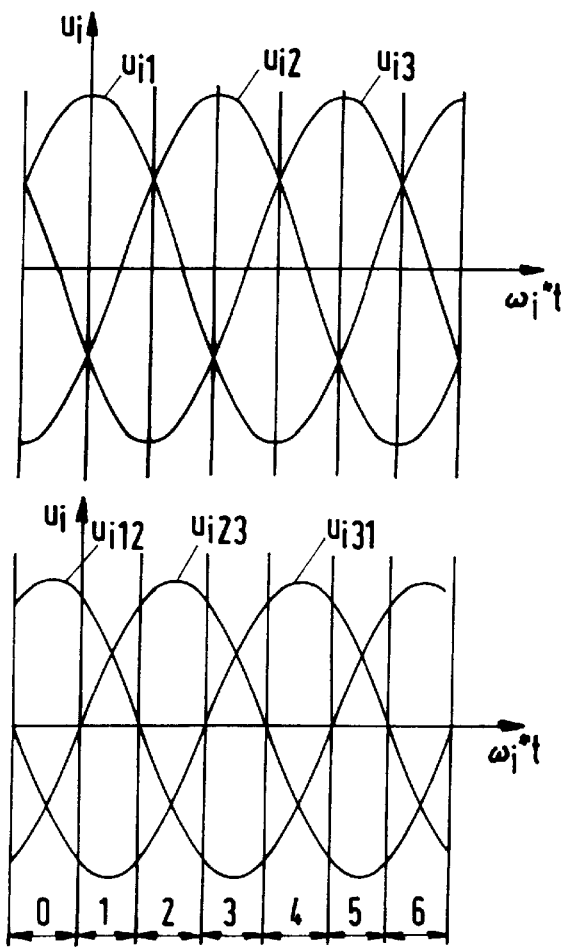
FIG. 2 is a graph showing a definition of 60° input voltage intervals.
Figure 5A:
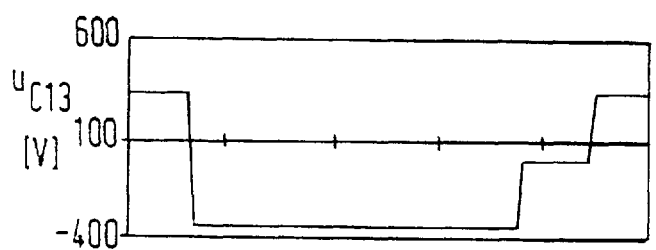
FIG. 5 is a graph showing switch voltages and a switch group current of the quasi-resonant rectifier in a voltage interval (voltage interval 6).
Figure 5B:
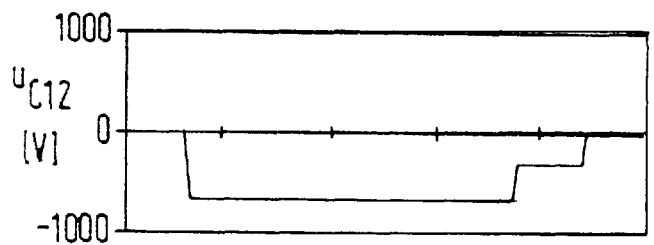
Figure 5C:
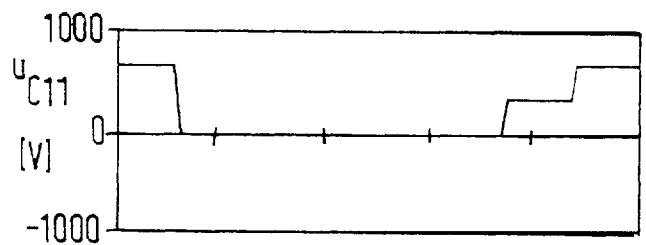
Figure 5D:
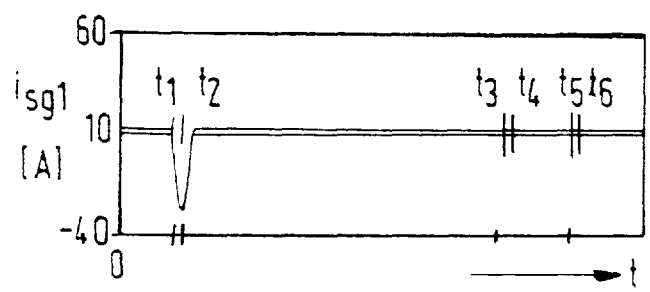

If symmetrical input voltages are assumed:

$$u_{i1} = U_i \cos(\Omega_i t + \theta_i)$$

$$u_{i2} = U_i \cos(\Omega_i t + \theta_i - 120°)$$

$$u_{i3} = U_i \cos(\Omega_i t + \theta_i + 120°)$$

with:

$$\omega_i = 2 \cdot \pi \cdot f_i = \frac{2 \cdot \pi}{T_i}$$

where:
 $U_i$=amplitude of the input voltage
 $\Omega_i$=network angular frequency
 $\theta_i$=displacement angle
 $f_i$=network frequency
 $T_i$=network period length,
it is possible to define six voltage intervals 1 to 6 ($u_i$ intervals) in which none of the three phase-to-phase voltages $u_{i12}$, $u_{i23}$, and $u_{i31}$ changes its polarity. In this respect FIG. 2 shows variations over time of the input voltages $u_{i1}$, $u_{i2}$, $u_{i3}$ and of the phase-to-phase voltages. For a displacement angle $\theta_i=0$, the following voltage intervals are obtained:
Voltage interval 1: $0° \leq \Omega_i t \leq 60°$ Voltage interval 2: 60°≦$\Omega_t$t≦120°
Voltage interval 3: 120°≦$\Omega_t$t≦180°
Voltage interval 4: 180°≦$\Omega_t$t≦240°
Voltage interval 5: 240°≦$\Omega_t$t≦300°
Voltage interval 6: 300°≦$\Omega_t$t≦360°

The table of the pulse pattern of the quasi-resonant rectifier according to FIG. 3 shows that in each of the six voltage intervals ($u_t$-intervals) 1 to 6, both for positive and negative output currents $i_{o1}$, $i_{o3}$ ($i_{ox}$>0, $i_{ox}$<0; x=1, 3), there is always a pulse pattern in which two capacitive commutations and one ARCP commutation (ARCP stands for Auxiliary Resonant Commutated Pole) takes place during one period $T_s$ of a switching frequency $f_s$. The "forward" switching sequence is designated by reference symbol F (commutation from $S_{11}$ to $S_{12}$ to $S_{13}$ to $S_{11}$ etc., and from $S_{31}$ to $S_{32}$ to $S_{33}$ to $S_{31}$ etc.) and the "backward" switching sequence is designated by reference symbol B (commutation from $S_{11}$ to $S_{13}$ to $S_{12}$ to $S_{11}$ etc. and from $S_{31}$ to $S_{33}$ to $S_{32}$ to $S_{31}$ etc.).

An ARCP commutation in this case is a capacitive commutation which is made possible by the conversion of an inductive commutation. The transformation of the inductive commutation is realized by reversing the polarity of the switch group current $i_{Sg1}$ and $i_{Sg3}$ using the auxiliary commutation device with the auxiliary switch $AS_{31}$.

However, the implementation of the ARCP commutations in the two switch groups requires not only the use of the switching sequences specified in the table according to FIG. 3 but also the synchronization of the two ARCP commutations in the two switch groups during the period $T_s$. If the pulse patterns of the table are used, the switch group with the shortest first pulse duty factor triggers the ARCP commutations in both switch groups. The pulse duty factor component which still remains in the switch group with the longer first pulse duty factor is then implemented at the end of the period $T_s$.

However, as an alternative to the pulse patterns specified in the table according to FIG. 3, it is also possible to synchronize the ARCP commutations with the same switching sequence at the end of the period $T_s$.

The current and voltage profiles of an ARCP commutation in a voltage interval (voltage interval 6) are described below with reference to FIG. 4 by way of example. The ARCP commutation in both switch groups is initiated by the active switching on of the auxiliary switch $AS_{31}$ ($i_{a31}$ rises). Due to the voltage polarity across the auxiliary branch $AS_{31}$–$L_{r3}$, the current $I_{a31}$ increases across the auxiliary commutation device to the same degree, in terms of absolute value, as the switch group currents $i_{Sg1}$ and $i_{Sg3}$ decrease in terms of absolute value, and finally change their polarity.

If a negative boost current $-i_b$ is reached, the conductive main switches in both switch groups are actively switched off at the same time (synchronization) and the switch group currents $i_{Sg1}$, $i_{Sg3}$ commutate initially into the three resonance capacitors $C_{rxy}$ (x=1,3; y=1,2,3) of the respective switch group.

The resonance capacitors are then recharged during an oscillation process, so that the main switches which are to be switched on and belong to the two switch groups can advantageously switch on passively with very low loss at a switch voltage of zero. Since the voltage $u_{o31}$ across the auxiliary commutation device changes its polarity (from $u_{i12}$ to $-u_{i12}$) during the oscillation process, the current $i_{a31}$ in the auxiliary commutation device decreases in terms of absolute value after the new main switches are switched on, and the switch group currents $i_{Sg1}$, $i_{Sg3}$ approach their steady-state values. Finally, the new steady state is reached when the auxiliary switch $AS_{31}$ is switched off during the interruption of the reverse current.

The dimensioning of the resonance capacitors $C_{rxy}$, and of the resonance inductor $L_{r3}$ is simplified significantly by the fact that the commutation voltage of the ARCP commutation is always the largest phase-to-phase voltage in terms of absolute value.

In addition to the ARCP commutation, two natural capacitive commutations take place in each of the two switch groups in each period of the switching frequency, and these commutations do not need to be synchronized (see the commutations designated by reference symbol c in the table).

FIG. 5 shows an example of the switch voltages $U_{C13}$, $U_{C12}$ and $U_{C11}$ of the main switches $S_{11}$, to $S_{13}$ and the switch group current $i_{Sg1}$ in the voltage interval 6. Since the output current $i_{o1}$ is positive, the pulse pattern $S_{12}$/$S_{11}$/$S_{13}$/$S_{12}$ is implemented in accordance with the table according to FIG. 3 (see penultimate line in the table where x=1). In a time period before $t_1$ the main switch $S_{12}$ is conductive, in a time period between $t_2$ and $t_3$ the main switch $S_{11}$ is conductive, in a time period between $t_4$ and $t_5$ the main switch $S_{13}$ is conductive, and in a time period after $t_6$ the main switch $S_{12}$ is conductive again.

The change in polarity of the switch group current $i_{Sg1}$ (in this respect also see the profile of $i_{Sg1}$ in FIG. 4 with the polarity change) brings about the ARCP commutation (designated by reference symbol a in the table according to FIG. 3) of the output current $i_{o1}$ from the main switch $S_{12}$ to the main switch $S_{11}$ with the cooperation of the auxiliary switch $AS_{31}$. The following two commutations of the output current $i_{o1}$ from the main switch $S_{11}$ to the main switch $S_{13}$, and from the main switch $S_{13}$ to the main switch $S_{12}$, are natural capacitive commutations (designated by reference symbol c in the table according to FIG. 3) which proceed without actuation of the auxiliary commutation device.

Thus, switching in the main switches is advantageously exclusively capacitive (i.e. actively off and passively on in the case of a zero switch voltage) and the main switches $S_{11}$, $S_{12}$, $S_{13}$ and $S_{31}$, $S_{32}$, and $S_{33}$ are operated as zero voltage switches ZVS. On the other hand the auxiliary switch $AS_{31}$ of the auxiliary commutation device only switches inductively (i.e. actively on and passively off during the interruption of the reverse current). Consequently, this auxiliary switch $AS_{31}$ operates as a zero current switch ZCS. Since the auxiliary switch $AS_{31}$ only conducts short current pulses, its rated current can be substantially lower than that of the main switches.

A reduction in the switching losses of the zero voltage switches ZVS can be realized if the resonance capacitance is increased beyond the minimum value given by the output capacitance of the semiconductor switches. It is possible to relieve the switching-on processes of the auxiliary switch $AS_{31}$ by increasing the resonance inductance $L_{r3}$. The boost current $i_b$ is to be dimensioned in such a way that the additional energy which it feeds into the oscillatory circuit clearly exceeds the losses occurring during the oscillation process.

The resonant rectifier circuit described above makes it possible, in comparison with a rectifier circuit of a conventional matrix converter, to not only realize very low switching losses but also to implement the converter protection in a simple way. For example, in the case of a short circuit in one or both of the switch groups of the converter, all of the main switches $S_{11}$, $S_{12}$, $S_{13}$, $S_{31}$, $S_{32}$, $S_{33}$ can be switched off actively if the auxiliary switch $AS_{31}$ is actively switched on directly after the main switches are switched off. The load current which may be flowing can then flow in the freewheeling circuit made available by the auxiliary commutation device. In this case, the auxiliary switch $AS_{31}$ must be dimensioned in such a way that it can conduct the freewheeling load current not only when it is turned on by short current pulses under steady-state conditions but also in the event of a fault.

I claim:

1. A rectifier circuit in a three-phase bridge connection, comprising:

two DC terminals;

an inductor connected to one of said DC terminals for supplying a DC current to a load;

four-segment main switches;

resonance capacitors each connected in parallel with a respective one of said main switches; and an auxiliary commutation device connected between said two DC terminals and having an auxiliary four-segment switch and a resonance inductor connected in series with said auxiliary four-segment switch.

2. The rectifier circuit according to claim 1, wherein at least one of said four-segment switches includes two parallel circuits connected in series with each other, each of said parallel circuits having an IGBT semiconductor and an inverse diode.

3. The rectifier circuit according to claim 1, wherein said main switches each have two symmetrically blockable GTO thyristors connected in parallel, and said auxiliary switch has two parallel, symmetrically blockable GTO thyristors.

4. The rectifier circuit according to claim 1, wherein said main switches each have two symmetrically blockable GTO thyristors connected in parallel, and said auxiliary switch has two parallel, blockable high-speed thyristors.

5. The rectifier circuit according to claim 1, wherein said resonance capacitors and said four-segment main switches define resonant switches, and wherein said rectifier circuit further comprises filter capacitors supplying voltages to said resonant switches.

6. The rectifier circuit according to claim 1, wherein at least one of said four-segment switches includes two parallel circuits connected in series with each other, each of said parallel circuits having an asymmetrical GTO thyristor and an inverse diode.

7. The rectifier circuit according to claim 1, further comprising pulse pattern means for controlling said main and auxiliary switches to achieve zero voltage switching in said main switches and zero current switching in said auxiliary switch.

8. The rectifier circuit according to claim 7, further comprising:

a first and a second switch group defined by said four-segment main switches; and pulse pattern means for creating two capacitive commutations and one resonant commutation in each of said first and second switch groups, said resonant commutations of said first and second switch groups performed synchronous with each other.

9. The rectifier circuit according to claim 8, wherein said pulse pattern means has a switching frequency with a period, and said resonant commutations of said first and second switch groups are performed at an end of said period of said switching frequency.

10. The rectifier circuit according to claim 8, wherein said pulse pattern means creates a pulse having a first duty cycle of shorter duration than any other pulse, and said resonant commutations of said first and second switch groups are performed at an end of said first duty cycle.

11. The rectifier circuit according to claim 7, which further comprises:

a first and a second switch group defined by said four-segment main switches; and pulse pattern means for creating two non-synchronized capacitive commutations and one synchronized resonant commutation, said pulse pattern means has a switching frequency with a period, and said communication are created in each of said first and second switch groups during said period of said switching frequency.

* * * * *